US010434850B2

(12) United States Patent
Eggers (10) Patent No.: US 10,434,850 B2
(45) Date of Patent: Oct. 8, 2019

(54) SAFETY CABLE FOR A FLEXIBLE COVER SYSTEM

(71) Applicant: Aero Industries, Inc., Indianapolis, IN (US)

(72) Inventor: Ronald Eggers, Freemont, NE (US)

(73) Assignee: Aero Industries, Inc., Indianapolis, IN (US)

( * ) Notice: Subject to any disclaimer, the term of this patent is extended or adjusted under 35 U.S.C. 154(b) by 144 days.

(21) Appl. No.: 15/874,470

(22) Filed: Jan. 18, 2018

(65) Prior Publication Data
US 2019/0217691 A1 Jul. 18, 2019

(51) Int. Cl.
*B60J 11/00* (2006.01)
*B60J 7/08* (2006.01)
*B60P 7/04* (2006.01)

(52) U.S. Cl.
CPC .............. *B60J 7/085* (2013.01); *B60P 7/04* (2013.01)

(58) Field of Classification Search
CPC ..... A01B 63/22; A01B 19/02; B25B 23/1427; B65G 2201/02; E02F 3/3405; B60J 7/085; F16F 1/10; A01K 89/01; A01K 89/0108; A01K 89/01084
USPC .................... 296/98, 100.14, 100.15, 100.16
See application file for complete search history.

(56) References Cited

U.S. PATENT DOCUMENTS

| 3,168,345 | A | * | 2/1965 | Roberts | B60J 7/1265 |
| | | | | | 296/100.14 |
| 3,549,197 | A | * | 12/1970 | Sibley | B60J 7/085 |
| | | | | | 296/100.14 |
| 3,549,198 | A | * | 12/1970 | Cappello | B60J 7/085 |
| | | | | | 296/100.14 |
| 3,549,199 | A | * | 12/1970 | Sibley | B60J 7/085 |
| | | | | | 296/100.14 |
| 3,628,826 | A | * | 12/1971 | Sibley | B60J 7/085 |
| | | | | | 296/98 |
| 3,656,802 | A | * | 4/1972 | White | B60J 7/062 |
| | | | | | 296/100.14 |
| 3,854,770 | A | * | 12/1974 | Grise | B60J 7/085 |
| | | | | | 296/100.14 |
| 3,975,047 | A | * | 8/1976 | McClellan | B60J 7/062 |
| | | | | | 296/100.14 |
| 4,023,857 | A | * | 5/1977 | Killion | B60J 7/068 |
| | | | | | 296/100.12 |
| 4,030,780 | A | * | 6/1977 | Petretti | B60J 7/085 |
| | | | | | 160/67 |

(Continued)

*Primary Examiner* — Kiran B Patel
(74) *Attorney, Agent, or Firm* — Maginot, Moore & Beck, LLP (57) ABSTRACT

A tarp deployment mechanism for covering a container with a flexible cover sized to cover the container in a deployed configuration is disclosed. The deployment mechanism comprises: a bail member spanning a width of the container and carrying one end of the flexible cover, the bail member movable to an extended position in which the one end of the flexible cover is adjacent one end of the container, the bail member having at least one hollow body portion that defines at least one cavity that extends throughout the hollow body portion of the bail member; and at least one cable arranged within the at least one cavity defined by the at least one hollow body portion of the bail member. The cable prevents complete dislocation of the bail member in the event of its fracture.

20 Claims, 10 Drawing Sheets

(56) References Cited

U.S. PATENT DOCUMENTS

| | | | | |
|---|---|---|---|---|
| 4,050,734 A | * | 9/1977 | Richard | B60J 7/085 296/100.14 |
| 4,095,840 A | * | 6/1978 | Woodard | B60J 7/085 296/100.13 |
| 4,126,351 A | * | 11/1978 | Peteretti | B60J 7/085 296/100.01 |
| 4,157,202 A | * | 6/1979 | Bachand | B60J 7/085 296/100.11 |
| 4,341,416 A | * | 7/1982 | Richard | B60J 7/085 296/100.15 |
| 4,516,802 A | * | 5/1985 | Compton | B60J 7/085 296/98 |
| 4,673,208 A | * | 6/1987 | Tsukamoto | B60J 7/085 160/243 |
| 4,740,029 A | * | 4/1988 | Tuerk | B60J 7/062 296/100.13 |
| 4,893,864 A | * | 1/1990 | Bailey | B60J 7/085 296/98 |
| 4,981,317 A | * | 1/1991 | Acosta | B60J 7/085 160/72 |
| 5,002,328 A | * | 3/1991 | Michel | B60J 7/085 296/98 |
| 5,031,955 A | * | 7/1991 | Searfoss | B60J 7/085 296/100.14 |
| 5,238,287 A | * | 8/1993 | Haddad, Jr. | B60J 7/085 160/71 |
| 5,275,459 A | | 1/1994 | Haddad, Jr. | |
| 5,340,187 A | * | 8/1994 | Haddad, Jr. | B60J 7/085 160/71 |
| 5,482,347 A | * | 1/1996 | Clarys | B60J 7/085 296/98 |
| 5,573,295 A | * | 11/1996 | Haddad, Jr. | B60J 7/085 296/100.01 |
| 5,713,712 A | | 2/1998 | McIntyre | |
| 5,829,818 A | * | 11/1998 | O'Daniel | B60J 7/085 296/98 |
| 5,957,523 A | * | 9/1999 | Haddad, Jr. | B60J 7/085 296/98 |
| 6,250,709 B1 | * | 6/2001 | Haddad, Jr. | B60J 7/085 296/100.01 |
| 6,273,490 B1 | | 8/2001 | Haddad, Jr. | |
| 6,338,521 B1 | * | 1/2002 | Henning | B60J 7/085 296/100.14 |
| 6,712,419 B1 | * | 3/2004 | Gothier | B60J 7/085 296/100.15 |
| 6,742,828 B2 | * | 6/2004 | Smith | B60J 7/085 296/98 |
| 6,748,962 B2 | * | 6/2004 | Miller | E04B 1/3211 135/120.3 |
| 7,025,401 B2 | * | 4/2006 | Martinson | B60J 7/062 296/100.01 |
| 7,118,157 B1 | * | 10/2006 | Bromberek | B60J 7/085 296/100.01 |
| 7,296,842 B2 | * | 11/2007 | Growcock | B60J 7/085 296/100.01 |
| 7,506,912 B2 | * | 3/2009 | Royer | B60J 7/085 296/98 |
| 7,878,573 B2 | * | 2/2011 | Limbacher | B60J 7/085 296/100.01 |
| 8,220,859 B2 | | 7/2012 | Reeder et al. | |
| 8,226,150 B1 | | 7/2012 | Schmeichel et al. | |
| 8,496,283 B1 | * | 7/2013 | Schmeichel | B60J 7/085 296/100.16 |
| 8,776,813 B2 | | 7/2014 | DeLap et al. | |
| 9,527,552 B2 | * | 12/2016 | Hey | B63B 17/02 |
| 10,023,033 B2 | * | 7/2018 | Searfoss | B60J 7/085 |
| 10,086,682 B2 | * | 10/2018 | Schmeichel | B60J 7/085 |
| 2002/0153033 A1 | * | 10/2002 | Miller | E04B 1/3211 135/121 |
| 2011/0115247 A1 | * | 5/2011 | Eggers | B60J 7/085 296/98 |
| 2011/0266826 A1 | * | 11/2011 | Prince | B60J 7/085 296/98 |
| 2012/0104788 A1 | * | 5/2012 | Prince | B60J 7/085 296/100.15 |
| 2013/0015418 A1 | * | 1/2013 | Vogel | B60J 7/085 254/129 |
| 2013/0328345 A1 | * | 12/2013 | Barley | B60J 7/085 296/98 |
| 2014/0145466 A1 | * | 5/2014 | Reeder | B60J 7/085 296/100.14 |

* cited by examiner

FIG. 13

SAFETY CABLE FOR A FLEXIBLE COVER SYSTEM

BACKGROUND

The present invention relates to flexible covers or tarping systems for open-topped containers and particularly concerns a mechanism for deploying the flexible cover or tarp on the container.

Many hauling vehicles, such as dump trucks, include open-topped containers used for hauling or storing various materials. In a typical dump truck application, the dump body is used to haul a variety of particulate material, such as gravel and the like, as well as organic materials, such as grain or produce.

Depending upon the nature of the materials stored in the open-topped container, it is often desirable to provide a cover for the container. A cover is particularly valuable when the containers are part of a vehicle, such as a dump truck. Rigid covers are well known that may be hinged from one end of the container body and pivoted from an open to a closed position. While rigid covers may be acceptable for stationary containers, the same is usually not true for land vehicles. In this industry, the rigid covers have given way to flexible cover systems. Systems of this type utilize a flexible tarpaulin that can be drawn from a stowed position at one end of the container, to a deployed position covering the open top of the vehicle container or bed. The flexible cover or tarpaulin is preferable in this arena because it can be easily stowed when the cover is not necessary, such as when a dump truck is being loaded or emptied. In addition, the flexible cover is generally easier to deploy than a rigid cover.

Figure 1:
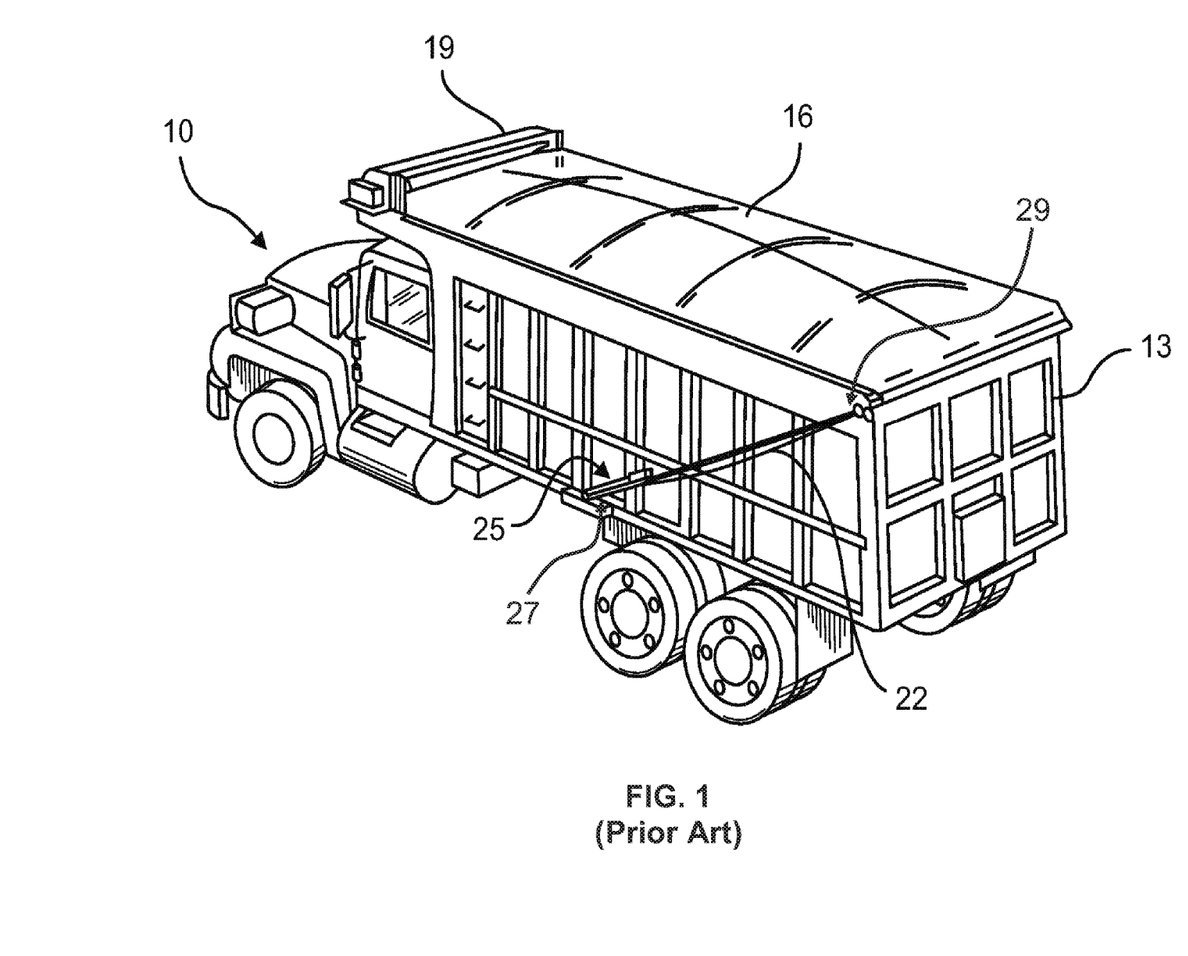
FIG. 1 is a top perspective view of a hauling vehicle utilizing a prior art flexible tarping system.

A variety of flexible cover or tarping systems have been developed that are geared toward particular hauling vehicle applications. One such tarping system is the Easy Cover® Tarping System manufactured and sold by Aero Industries, Inc. An example of one form of the Easy Cover® Tarping System is shown in FIG. 1. The system includes a tarp deployment mechanism in the form of a U-shaped bail member 22 that is connected at a pivot mount 25 to the base of the container body 13 on vehicle 10. The horizontal section of the U-shaped bail is attached to the tarp 16. The tarp 16 can be preferably stowed by winding onto a tarp roller 19 at the forward end of the vehicle.

The pivot mount 25 and the tarp roller 19 can be of a variety of configurations that permit manual or powered deployment. In one typical installation the pivot mount 25 includes a torsion spring pack that is biased to rotate the bail member 22 (clockwise in the figure) to pull the tarp 16 over the top of the container 13. The tarp roller 19 is biased to resist this rotation of the bail member. In some versions, a manual crank rotates the tarp roller 19 to allow the tarp 16 to unfurl under the torsion force of the spring pack. In other versions, a motor controls the rotation of the tarp roller. The manual crank or motor are rotated in the opposite direction to pull the bail member 22 toward the front of the container body 13 and to thereby stow the tarp 16 in its open position.

One risk that is sometimes faced with tarping systems of the type shown in FIG. 1 is a potential mechanical failure of the bail member 22. Particularly, as discussed above, the pivot mount 25 includes a torsion spring pack that is biased to rotate the bail member 22. The torsion spring pack applies a torque (clockwise in the figure) at a first end 27 to the bail member 22, which causes rotation (clockwise in the figure) of the bail member 22. The rotation of the bail member 22 is stopped when a second end 29 of the bail member 22, which is connected to the tarp 16, brings the tarp 16 into contact with the top of the container 13.

When the tarp 16 is in this deployed position, the torsion spring pack continues to apply torque to the bail member 22, thereby inducing stresses in the body of the bail member 22. As the tarp deployment mechanism ages, these stresses, in combination with environmental wear and other factors, can lead to fractures in the bail member 22. Fractures in the bail member 22 can also occur in a collision involving the vehicle 10. In most cases the fractures are minor and noticeable to the vehicle owner/operator who can replace the affected component. However, in some cases the fracture is not evident or is relatively immediate, and in extreme cases the fracture leads to a failure or breakage of the bail member. In the event of a breakage of the bail member 22, a portion of the bail member 22 that remains attached to the pivot mount 25 can freely rotate. The torsion spring pack causes the portion of the bail member 22 that remains attached to the pivot mount 25 to rotate rapidly and forcefully, which presents a danger to any person or thing in the path of the bail member.

Although the risks of mechanical failure can be mitigated through proper maintenance and periodic inspection of the tarp deployment mechanism, there remains a need for a tarping system with improved safety in the event of mechanical failure.

SUMMARY

A tarp deployment mechanism for covering a container with a flexible cover sized to cover the container in a deployed configuration is disclosed. The deployment mechanism comprises: a bail member spanning a width of the container and carrying one end of the flexible cover, the bail member movable to an extended position in which the one end of the flexible cover is adjacent one end of the container, the bail member having at least one hollow body portion that defines at least one cavity that extends throughout the hollow body portion of the bail member; and at least one cable arranged within the at least one cavity defined by the at least one hollow body portion of the bail member.

Additionally, a covering system for covering a container is disclosed. The covering system comprises: a flexible cover sized to cover the container in a deployed configuration; and a deployment mechanism configured to cover the container with the flexible cover. The deployment mechanism comprises: a bail member spanning a width of the container and carrying one end of the flexible cover, the bail member movable to an extended position in which the one end of the flexible cover is adjacent one end of the container, the bail member having at least one hollow body portion that defines at least one cavity that extends throughout the hollow body portion of the bail member; and at least one cable arranged within the at least one cavity defined by the at least one hollow body portion of the bail member.

BRIEF DESCRIPTION OF THE DRAWINGS

The foregoing aspects and other features of a tarp deployment mechanism and covering system having the tarp deployment mechanism are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Figure 2:
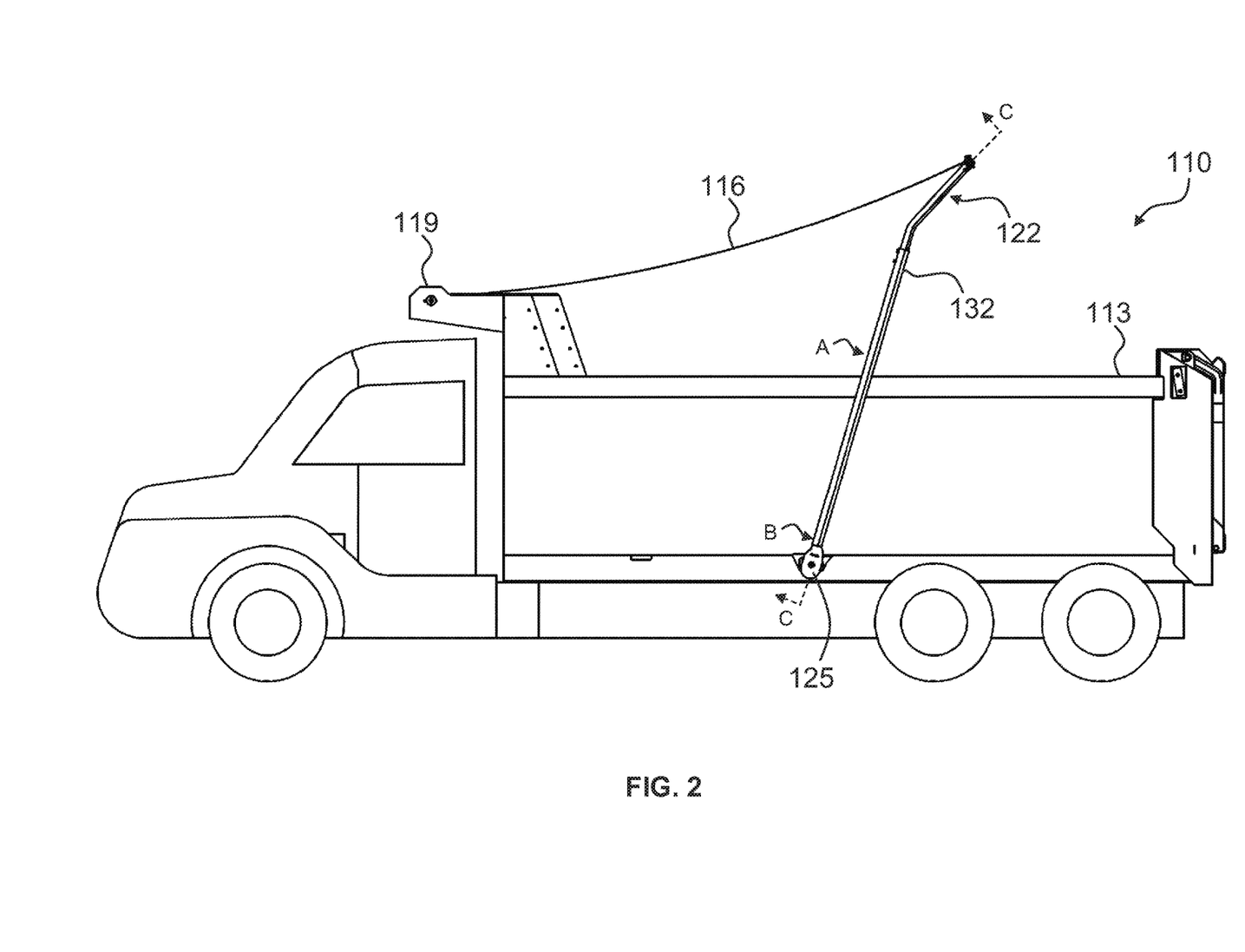
FIG. 2 is a side perspective view of a hauling vehicle utilizing a flexible tarping system according to the disclosure.
Figure 3:
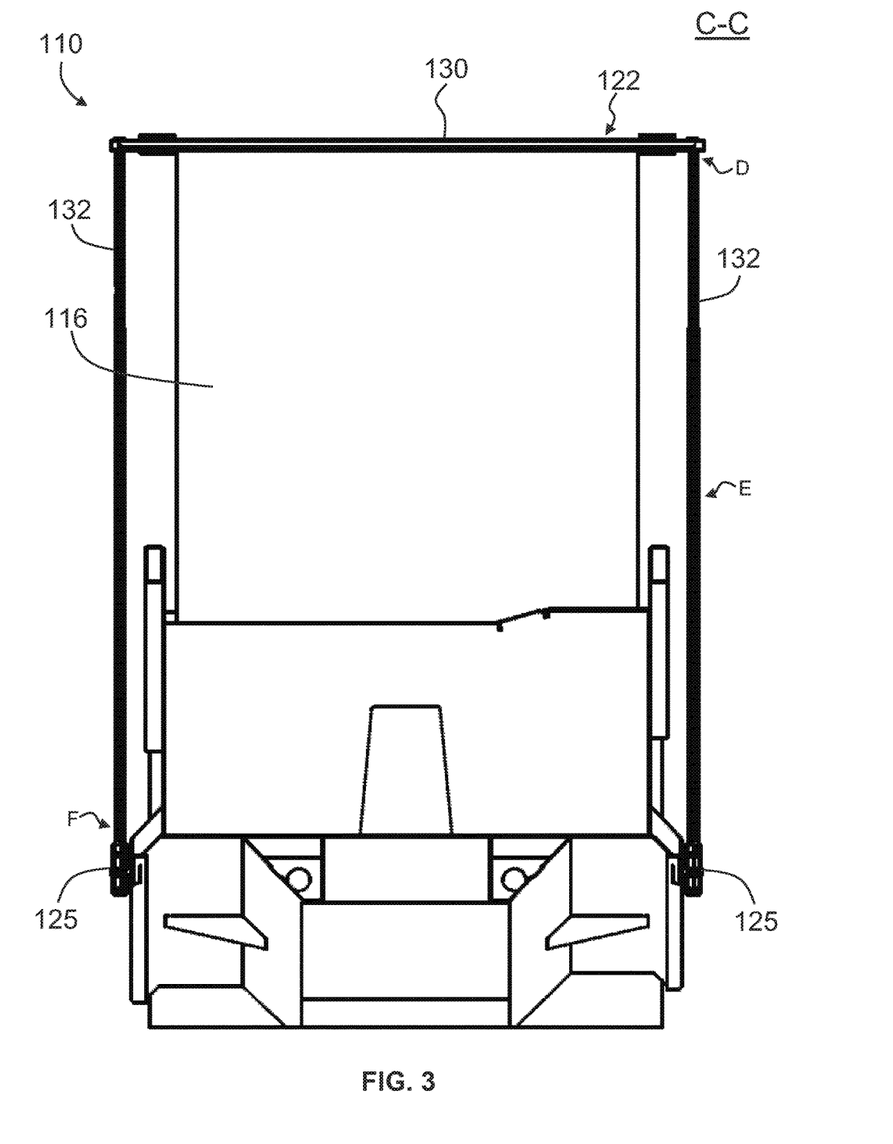
FIG. 3 is a cross-sectional view of a cross-section C-C of the hauling vehicle, as identified in FIG. 2.
Figure 4:
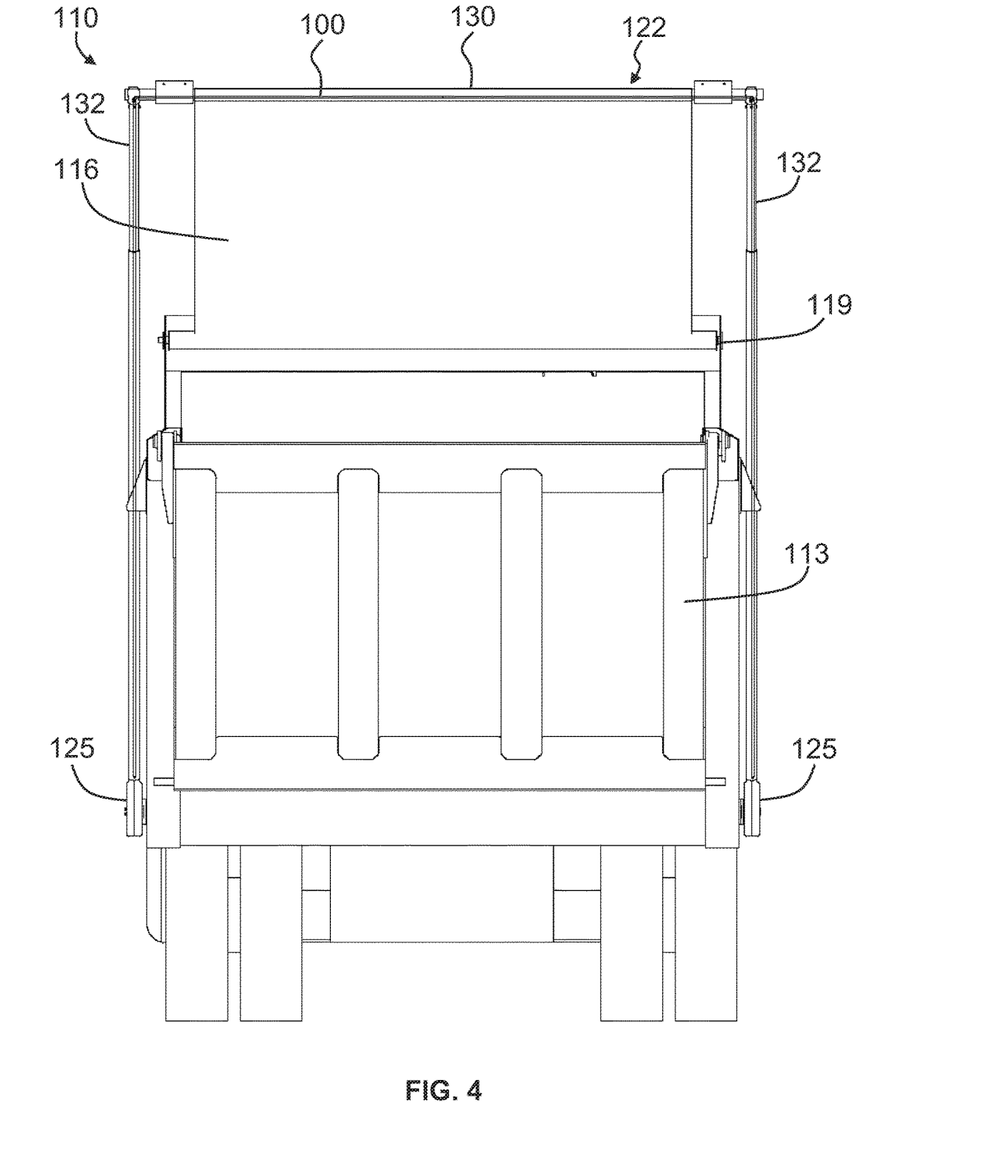
FIG. 4 is a rear perspective view of the hauling vehicle.

FIGS. 2-4 show a vehicle 110 equipped with a tarp deployment mechanism having improved safety. The tarp deployment mechanism includes a bail member 122 configured to move a tarp 116 between a stowed position in which the tarp 116 covers a container body 113 of the vehicle 110 and a deployed position in which the tarp does not cover the container body 113. The bail member 122 at least includes a horizontal section 130 (best seen in FIG. 3 and FIG. 4) that is attached to a tarp 116 and is movable to transition between the stowed position and the deployed position. In the embodiment shown, the bail member 122 is in the form of a U-shaped bail member 122 having the horizontal section 130 and side sections 132 (which may also be referred to herein as the horizontal arm and side arms). Each of the side sections 132 are perpendicularly connected to a respective end of the horizontal section 130 and extend toward a base of the container body 113. In some embodiments, the side sections 132 comprise a telescoping arm to enable adjustment of a length of the side sections 132.

Pivot mounts 125 are provided to connect the side sections 132 of the U-shaped bail member 122 to the base of the container body 113. The pivot mounts 125 are configured to rotate the bail member 122 (clockwise in the figure) to pull the tarp 116 over the top of the container 113 toward a rear end of the vehicle 110 into the deployed position. In some embodiments, the pivot mounts 125 include a torsion spring pack, or equivalent mechanism, that is biased to rotate the bail member 122 to pull the tarp 116 into the deployed position. In some embodiments, the pivot mount 125 is actuated by a motor or hand crank mechanism to rotate the bail member 112 to pull the tarp 116 into the deployed position. In some embodiments, the tarp 116 is stowed by winding onto a tarp roller 119 at a forward end of the vehicle 110. In some embodiments, the tarp roller 119 is similarly biased by a torsion spring pack and/or actuated by a motor or hand crank mechanism to wind the tarp 116 into the stowed position.

Figure 5:
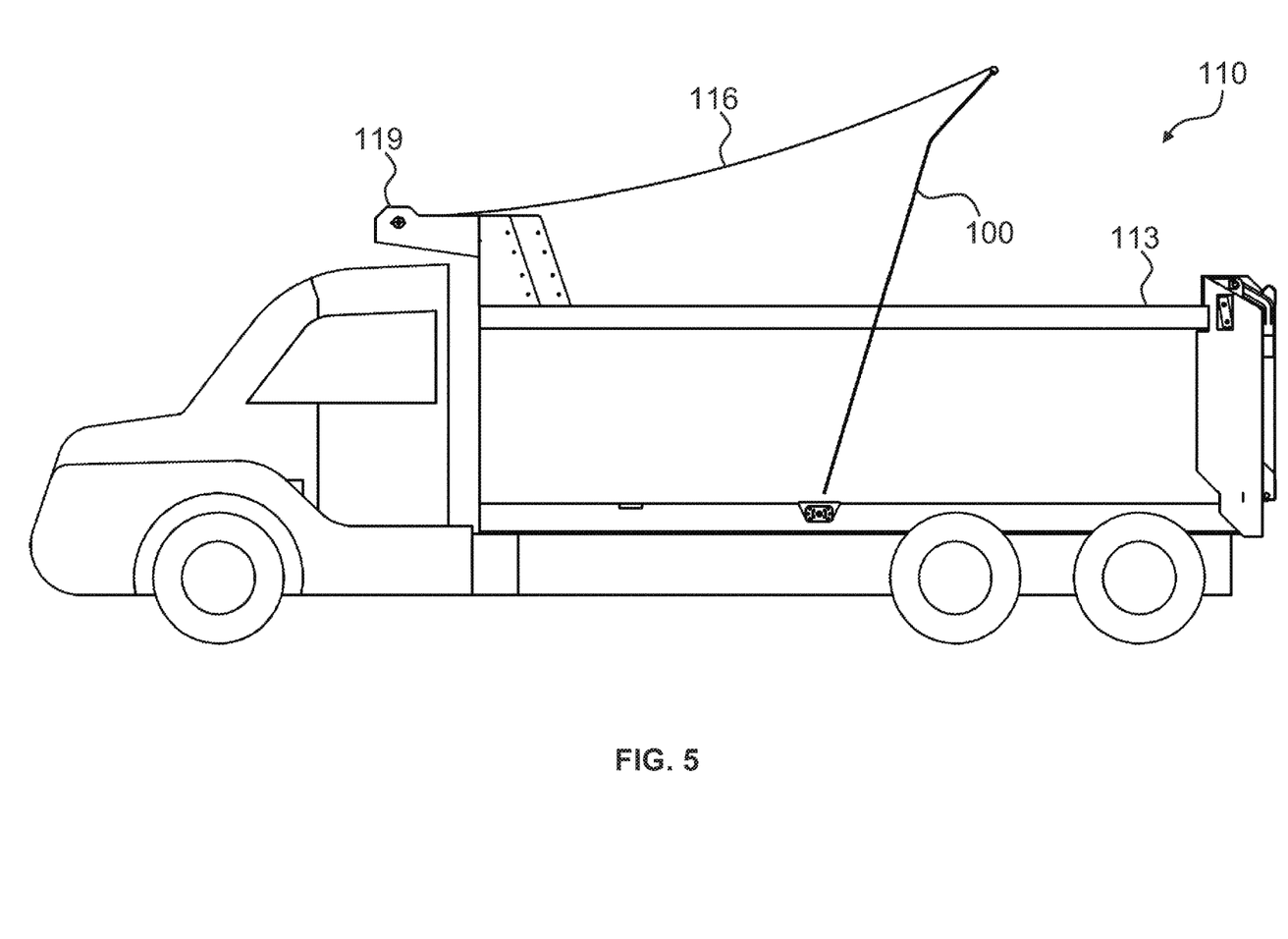
FIG. 5 is a side perspective view of the hauling vehicle with the bail member hidden to show the safety cable.
Figure 6:
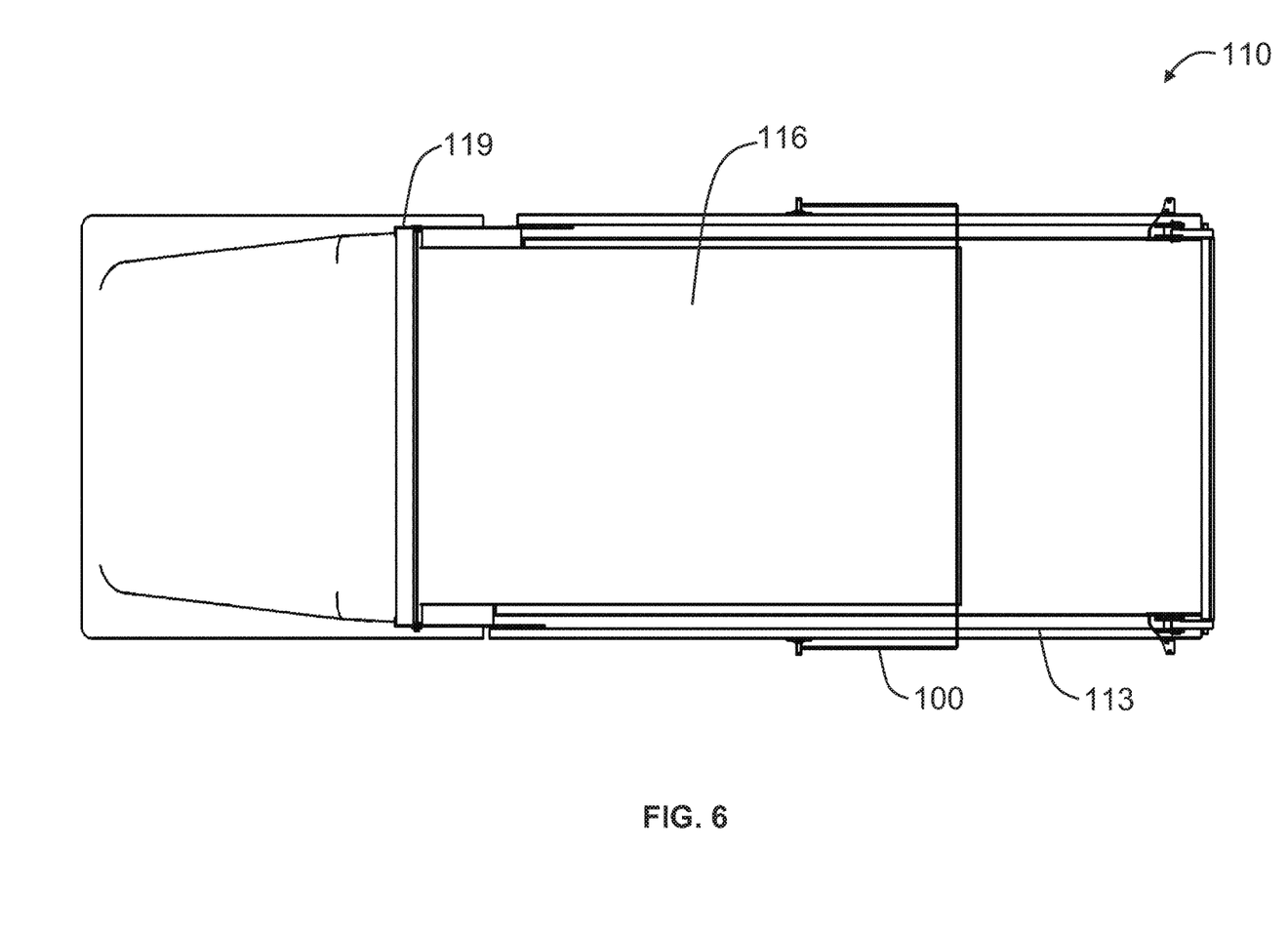
FIG. 6 is a top perspective view of the hauling vehicle with the bail member hidden to show the safety cable.

In accordance with the disclosure, at least one safety cable 100 is provided for the tarp deployment mechanism. Particularly, the bail member 122 is at least partly formed with a hollow or tubular body such that a cavity extends throughout at least part of the bail member 122. The safety cable 100 is enclosed by the tubular body of the bail member 122 and extends through the cavity throughout at least part of the bail member 122. FIGS. 5-6 show the vehicle 110 with the bail member 122 hidden to reveal the enclosed safety cable 100. As shown, the safety cable 100 extends from a first of the pivot mounts 125 on a first side of the vehicle 110 to a second of the pivot mounts 125 on a second side of the vehicle 110 that is opposite the first side of the vehicle 110.

However, the safety cable 100 need not necessarily comprise a single continuous cable extending through the entirety of the bail member 122. Particularly, in an alternative embodiment shown in FIG. 7, separate safety cable segments are provided that extend through each section 130, 132 of the bail member 122. Particularly, a first safety cable 102 extends through a first side section 132 from a first pivot mount 125 to a first end of the horizontal section 130, a second safety cable 104 extends through a second side section 132 from a second pivot mount 125 to a second end of the horizontal section 130, and a third safety cable 106 extends through the horizontal section 130 from the first end of the horizontal section 130 to the second end of the horizontal section 130. The separate cable segments 102, 104, 106 are anchored at each end to the respective ends of the sections 130, 132 of the bail member. In a further embodiment, the third safety cable 106 extending through the horizontal section 130 is omitted and only the side sections 132 are provided with safety cables 102, 104. Various other arrangements of the safety cable are possible.

Figure 8:
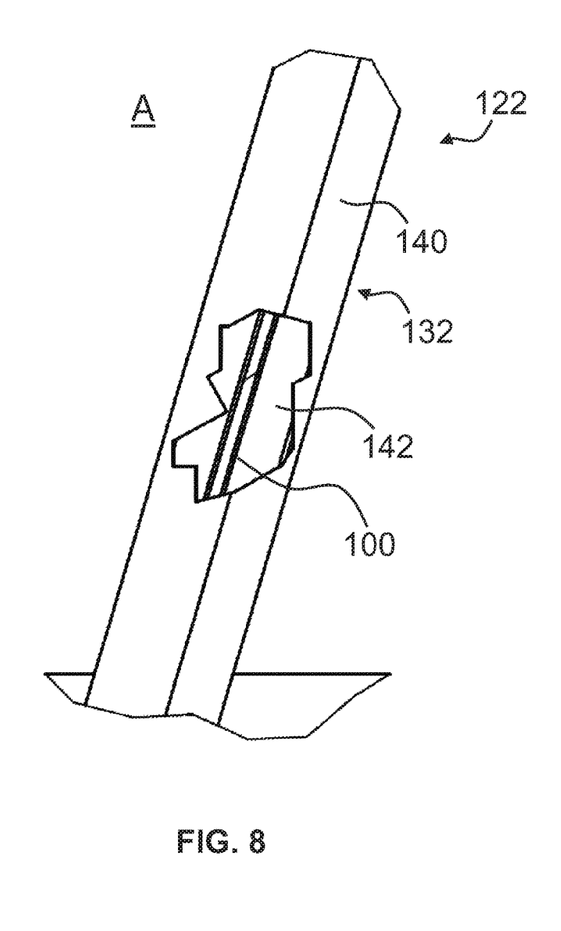
FIG. 8 is a detail view of section A of the bail member, as identified in FIG. 2.

FIG. 8 shows a detail view of section A of the bail member 122, as identified in FIG. 2. As can be seen, the side section 132 of the bail member 122 comprises an elongated hollow body 140 that defines an internal cavity 142. In the embodiment shown, the hollow body 140 comprises a tube having a quadrilateral cross-section, but the tube may also have a rectangular, square, triangular, circular, or any other cross-section. In at least one embodiment, the hollow body 140 is formed of aluminum, steel, or iron.

The safety cable 100 is enclosed within the hollow body 140 and extends through the internal cavity 142. In one embodiment, the safety cable 100 comprises a wire rope having a plurality of metal wire strands (e.g., steel, aluminum, wrought iron, etc.) twisted into a helix, braid, or other structure. The cable can be a ¼ inch diameter flexible steel cable. The cable may be encased within a sheath to mitigate vibration of the cable within the internal cavity. In other embodiments, the safety cable 100 may comprise a synthetic rope, metal chain, or a single strand cable.

Figure 9:
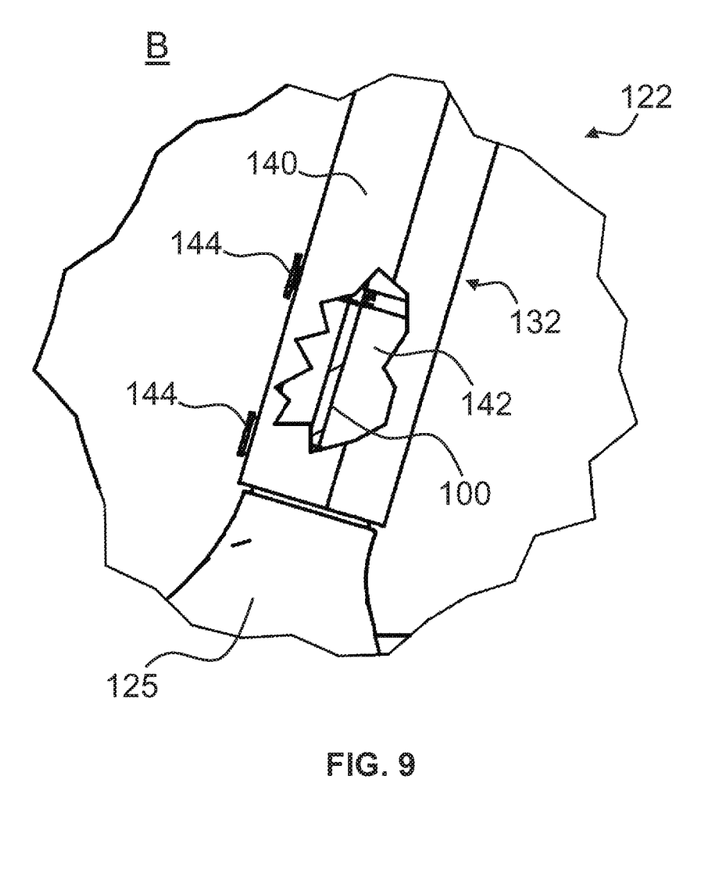
FIG. 9 is a detail view of section B of the bail member, as identified in FIG. 2.

FIG. 9 shows a detail view of section B of the bail member 122, as identified in FIG. 2. As can be seen, the hollow body 140 of the side section 132 is fastened to the pivot mount 125 by fasteners 144. In one embodiment, the safety cable 100 is anchored at one end to the pivot mount 125. However, in other embodiments, the safety cable 100 is anchored at to the end of hollow body 140. In some embodiments, the safety cable 100 is anchored at one end to the pivot mount 125 and/or the end of the hollow body 140 via the fasteners 144 or another fastener.

Figure 10:
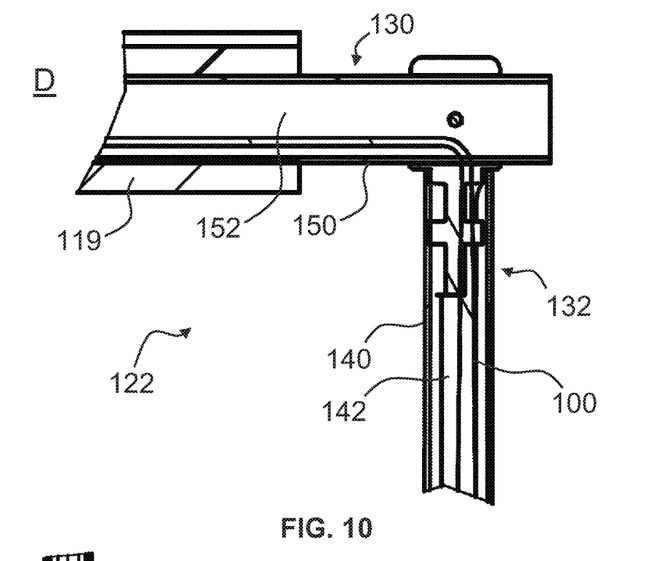
FIG. 10 is a cross-sectional detail view of section D of the bail member, as identified in FIG. 3.

FIG. 10 shows a cross-sectional detail view of section D of the bail member 122, as identified in FIG. 3. As can be seen, the horizontal section 130 of the bail member 122 comprises an elongated hollow body 150 that defines an internal cavity 152. The tarp 119 is attached along a length of the hollow body 150. In the embodiment shown, the hollow body 150 comprises a tube having a circular cross-section, but the tube may also have a quadrilateral, rectangular, square, triangular, or any other cross-section. In at least one embodiment, the hollow body 150 is formed of aluminum, steel, or iron.

One end of the hollow body 150 of the horizontal section 130 is perpendicularly attached the hollow body 140 of the side section 132 with a fastener 154. In some embodiments, the hollow body 150 of the horizontal section 130 is inserted into a socket and/or bushing arranged in the end of the hollow body 140 of the side section 132, such that the hollow body 150 of the horizontal section 130 is freely rotatable along a longitudinal axis thereof.

Figure 7:
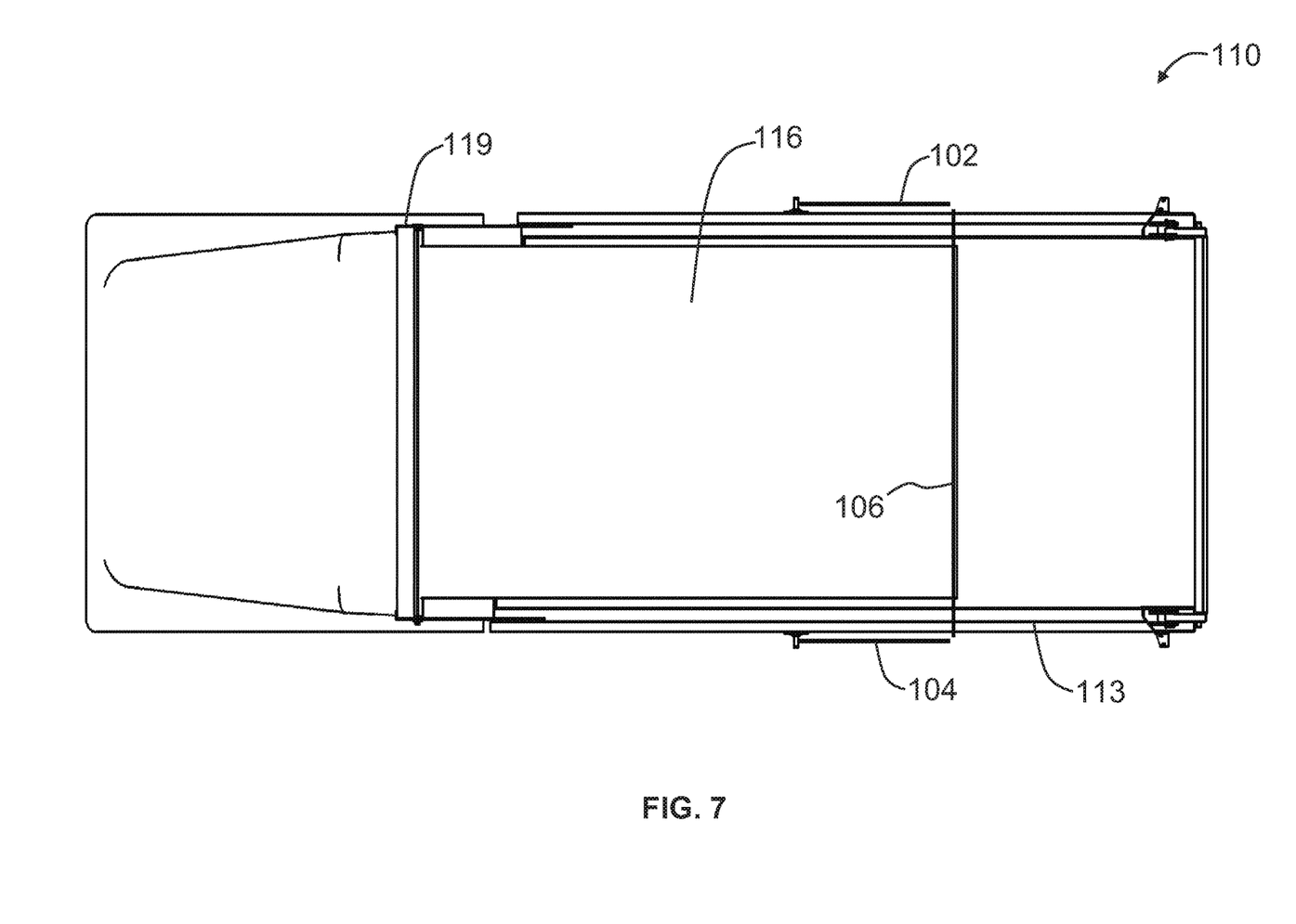
FIG. 7 is a top perspective view of the hauling vehicle with the bail member hidden to show separate safety cable segments.

In the embodiment shown, the safety cable 100 extends from the cavity 142 of the side section 132 into the cavity 152 of the horizontal section 130. The safety cable 100 extends through the length of the horizontal section 130, through the other of the side sections 132 and is ultimately anchored at the other pivot mount 125. In other embodiments, the safety cable 102, 104 (as shown in FIG. 7) of the side sections 132 are anchored at the perpendicular junctions of the horizontal section 130 and the side sections 132. A separate safety cable 106 (as shown in FIG. 7) may be provided within the cavity 152 of the horizontal section 130 and anchored at each end of the hollow body 150 of the horizontal section 130.

Figure 11:
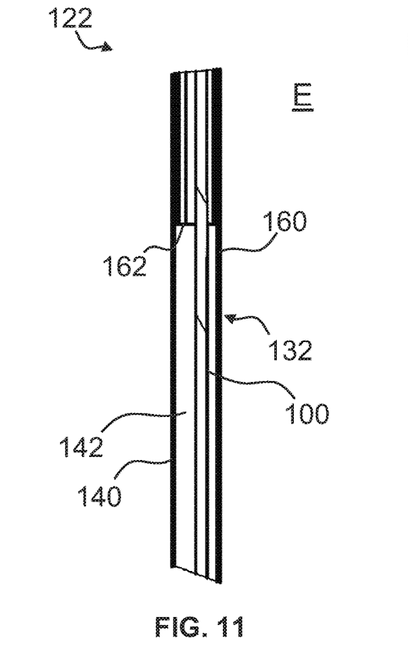
FIG. 11 is a cross-sectional detail view of section E of the bail member, as identified in FIG. 3.

FIG. 11 shows a cross-sectional detail view of section E of the bail member 122, as identified in FIG. 3. As mentioned above, in some embodiments, the side sections 132 of the bail member 122 are telescoping arms. Particularly, the hollow body 140 has outer tube portion 160 and an inner tube portion 162. The outer tube portion 160 has larger diameter than the inner tube portion 162, such that the inner tube portion is insertable into the cavity of the outer tube portion 160. The safety cable 100 extends through both the outer tube portion 160 and the inner tube portion 162. In some embodiments, the safety cable 100 is provided with sufficient slack to accommodate some adjustment in length of the side section 132 due to telescoping of the hollow body 140. In some embodiments, the length of the safety cable 100 is cut depending on the needs of a particular installation of tarp deployment mechanism.

Figure 12:
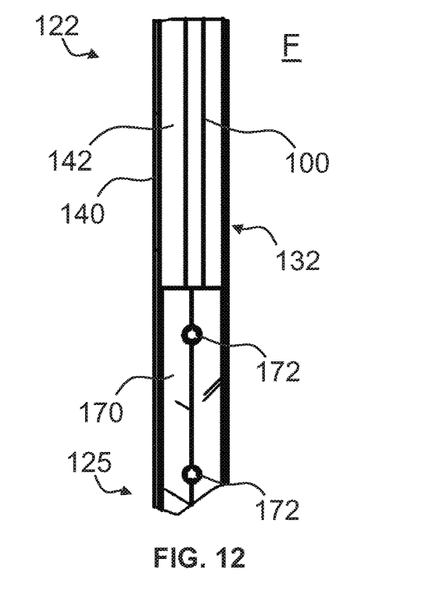
FIG. 12 is a cross-sectional detail view of section F of the bail member, as identified in FIG. 3.

FIG. 12 shows a cross-sectional detail view of section F of the bail member 122, as identified in FIG. 3. A body of the pivot mount 125 has a portion 170 that extends into the cavity 142 of side section 132. In one embodiment, the portion 170 defines openings 172 configured to receive the fasteners 144 (shown in FIG. 9). In one embodiment, the safety cable 100 is anchored at one end to the portion 170 of the pivot mount 125.

Figure 13:
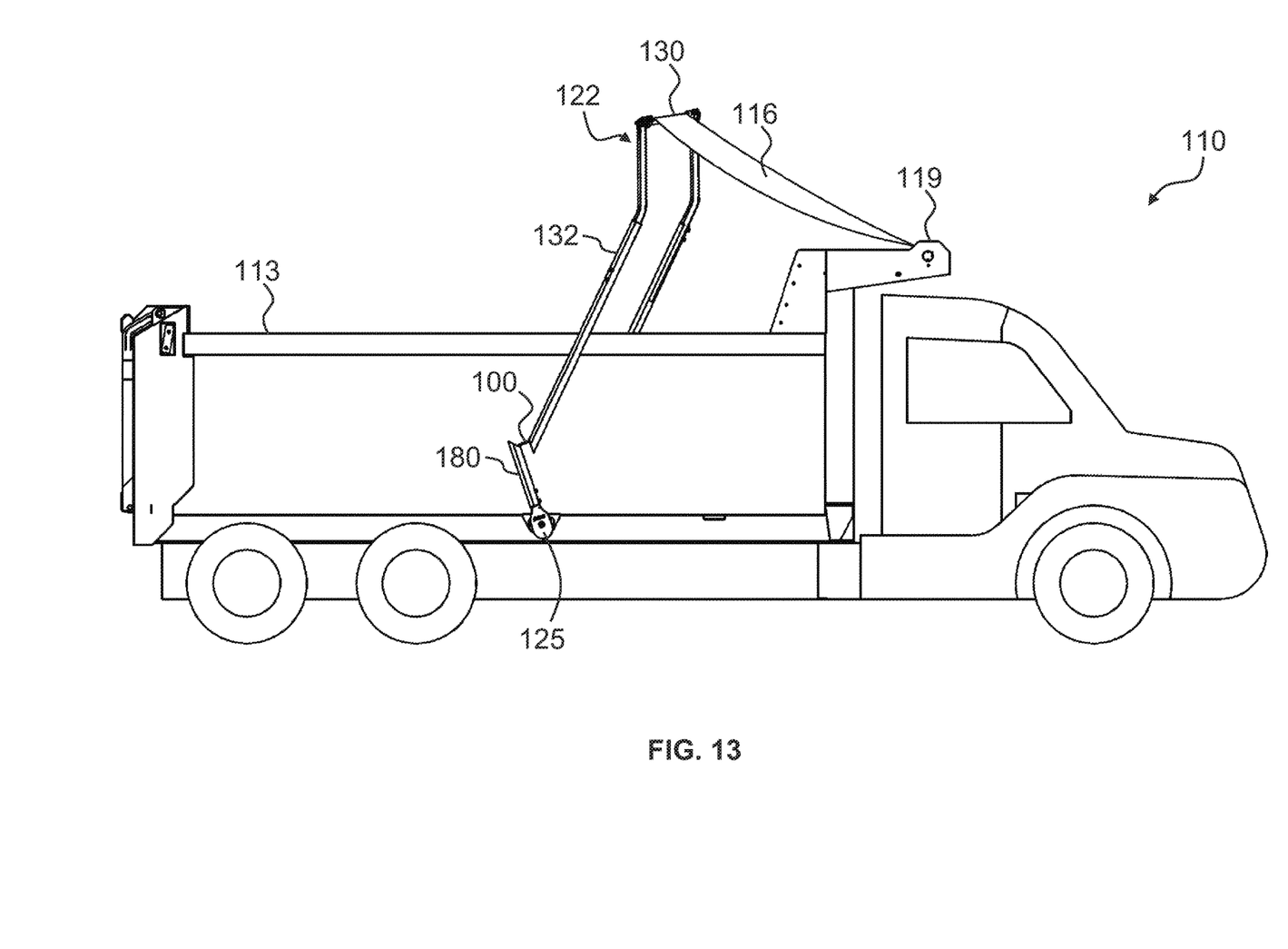
FIG. 13 is a side perspective view of the hauling vehicle with a breakage of a side section of the bail arm.

FIG. 13 illustrates the improved safety of the tarp deployment mechanism according to the disclosure. As can be seen, one of the side sections 132 of the bail member 122 has suffered a mechanical failure. Particularly, the hollow body 140 of the side section 132 has broken into two pieces. Prior to the breakage, the tarp 116 resists rotation (counterclockwise in the figure) of the bail member 122 due to the biasing of the pivot mount 125. However, after the breakage, a portion 180 of the side section 132 that remains attached to the pivot mount 125 rotates due to the biasing of the pivot mount 125. If not for the safety cable 100, the portion 180 would rotate freely, which would present a danger to any persons in the vicinity. However, with the inclusion of the safety cable 100, the portion 180 is prevented from rotating more than a short distance, thereby improving the safety of the tarp deployment mechanism in the event of a breakage. The safety cable thus prevents complete dislocation of the fractured parts of the bail member. The amount of separation of the fractured parts can be limited by the amount of tension in the safety cable.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

For instance, it is understood that the bail arms can be pivotably mounted to a frame of a hauling vehicle, rather than to the container body. The safety cable disclosed herein can thus be used on a roll-off container vehicle in which the body being covered is loaded onto the vehicle frame and the cover system is not directly mounted to the container body. In the illustrated embodiments, the bail arms are deployed by a torsion spring pack. However, it is understood that other mechanisms can be used to pivot the bail arms, such as a pneumatic or hydraulic cylinder arrangement.

What is claimed is:

1. A deployment mechanism for covering a container with a flexible cover sized to cover the container in a deployed configuration, the deployment mechanism comprising:
    an elongated bail member spanning a width of the container and carrying one end of the flexible cover, the bail member movable to an extended position in which the one end of the flexible cover is adjacent one end of the container, the bail member having at least one hollow body portion that defines at least one cavity that extends throughout the hollow body portion of the bail member; and
    at least one cable arranged within the at least one cavity defined by the at least one hollow body portion of the bail member, the at least one cable anchored at its opposite ends so that the cable prevents complete dislocation of the bail member when fractured.

2. The deployment mechanism of claim 1, the bail member comprising:
    a horizontal arm spanning the width of the container and carrying the one end of the flexible cover, the horizontal arm having a first end and a second end opposite the first end;
    a first side arm having a first end and a second end opposite the first end, the first end of the first side arm perpendicularly connected to the first end of the horizontal arm, the second end of the first side arm pivotably connected to a first side of a base of the container; and
    a second side arm having a first end and a second end opposite the first end, the first end of the second side arm perpendicularly connected to the second end of the horizontal arm, the second end of the second side arm pivotably connected to a second side of the base of the container opposite the first side of the base of the container, wherein at least one of the horizontal arm, the first side arm, and the second side arm comprise the at least one hollow body portion of the bail member.

3. The deployment mechanism of claim 2, wherein:
the at least one hollow body portion of the bail member is comprised of the first side arm, the second side arm, and the horizontal arm;
the at least one cavity includes a first cavity extending through a length of the first side arm, a second cavity extending through a length of the second side arm, and a third cavity extending through a length of the horizontal arm; and
the at least one cable extends from the second end of the first side arm to the second end of the second side arm through each of the first cavity, the second cavity, and the third cavity.

4. The deployment mechanism of claim 3, wherein a first end of the at least one cable is anchored to the second end of the first side arm and a second end of the at least one cable is anchored to the second end of the second side arm.

5. The deployment mechanism of claim 3, wherein:
the second end of the first side arm is pivotably connected to the first side of the base of the container with a first pivot mount, a first end of the at least one cable anchored to the first pivot mount; and
the second end of the second side arm is pivotably connected to the second side of the base of the container with a second pivot mount, a second end of the at least one cable anchored to the second pivot mount.

6. The deployment mechanism of claim 2, wherein:
the at least one hollow body portion of the bail member is comprised of the first side arm, and the second side arm;
the at least one cavity includes a first cavity extending through a length of the first side arm and a second cavity extending through a length of the second side arm; and
the at least one cable includes a first cable extending through the first cavity from the first end of the first side arm to the second end of the first side arm and a second cable extending through the second cavity from the first end of the second side arm to the second end of the second side arm.

7. The deployment mechanism of claim 6, wherein:
a first end of the first cable is anchored to the first end of the first side arm and a second end of the first cable is anchored to the second end of the first side arm; and
a first end of the second cable is anchored to the first end of the second side arm and a second end of the second cable is anchored to the second end of the second side arm.

8. The deployment mechanism of claim 6, wherein:
the second end of the first side arm is pivotably connected to the first side of the base of the container with a first pivot mount, a first end of the first cable anchored to the first end of the first side arm and a second end of the first cable anchored to the first pivot mount; and
the second end of the second side arm is pivotably connected to the second side of the base of the container with a second pivot mount, a first end of the second cable anchored to the first end of the first side arm and a second end of the second cable anchored to the second pivot mount.

9. The deployment mechanism of claim 1, wherein the at least one cable comprises a wire rope having a plurality of metal wire strands.

10. The deployment mechanism of claim 2, wherein the first side arm and the second side arm are telescoping armed configured to have an adjustable length.

11. A covering system for covering a container, the cover system comprising:
a flexible cover sized to cover the container in a deployed configuration; and
a deployment mechanism configured to cover the container with the flexible cover, the deployment mechanism comprising:
a bail member spanning a width of the container and carrying one end of the flexible cover, the bail member movable to an extended position in which the one end of the flexible cover is adjacent one end of the container, the bail member having at least one hollow body portion that defines at least one cavity that extends throughout the hollow body portion of the bail member; and
at least one cable arranged within the at least one cavity defined by the at least one hollow body portion of the bail member.

12. The covering system of claim 11, the bail member comprising:
a horizontal arm spanning the width of the container and carrying the one end of the flexible cover, the horizontal arm having a first end and a second end opposite the first end;
a first side arm having a first end and a second end opposite the first end, the first end of the first side arm perpendicularly connected to the first end of the horizontal arm, the second end of the first side arm pivotably mounted at a first side of a base of the container; and
a second side arm having a first end and a second end opposite the first end, the first end of the second side arm perpendicularly connected to the second end of the horizontal arm, the second end of the second side arm pivotably mounted at a second side of the base of the container opposite the first side of the base of the container,
wherein at least one of the horizontal arm, the first side arm, and the second side arm comprise the at least one hollow body portion of the bail member.

13. The covering system of claim 12, wherein:
the at least one hollow body portion of the bail member is comprised of the first side arm, the second side arm, and the horizontal arm;
the at least one cavity includes a first cavity extending through a length of the first side arm, a second cavity extending through a length of the second side arm, and a third cavity extending through a length of the horizontal arm; and
the at least one cable extends from the second end of the first side arm to the second end of the second side arm through each of the first cavity, the second cavity, and the third cavity.

14. The covering system of claim 13, wherein a first end of the at least one cable is anchored to the second end of the first side arm and a second end of the at least one cable is anchored to the second end of the second side arm.

15. The covering system of claim 13, wherein:
the second end of the first side arm is pivotably mounted at the first side of the base of the container with a first pivot mount, a first end of the at least one cable anchored to the first pivot mount; and
the second end of the second side arm is pivotably mounted at the second side of the base of the container with a second pivot mount, a second end of the at least one cable anchored to the second pivot mount.

16. The covering system of claim 12, wherein:

the at least one hollow body portion of the bail member is comprised of the first side arm, and the second side arm;

the at least one cavity includes a first cavity extending through a length of the first side arm and a second cavity extending through a length of the second side arm; and the at least one cable includes a first cable extending through the first cavity from the first end of the first side arm to the second end of the first side arm and a second cable extending through the second cavity from the first end of the second side arm to the second end of the second side arm.

17. The covering system of claim 16, wherein:

a first end of the first cable is anchored to the first end of the first side arm and a second end of the first cable is anchored to the second end of the first side arm; and a first end of the second cable is anchored to the first end of the second side arm and a second end of the second cable is anchored to the second end of the second side arm.

18. The covering system of claim 16, wherein:

the second end of the first side arm is pivotably mounted at the first side of the base of the container with a first pivot mount, a first end of the first cable anchored to the first end of the first side arm and a second end of the first cable anchored to the first pivot mount; and the second end of the second side arm is pivotably mounted at the second side of the base of the container with a second pivot mount, a first end of the second cable anchored to the first end of the first side arm and a second end of the second cable anchored to the second pivot mount.

19. The covering system of claim 11, wherein the at least one cable comprises a wire rope having a plurality of metal wire strands.

20. The covering system of claim 12, wherein the first side arm and the second side arm are telescoping configured to have an adjustable length.

* * * * *